UNITED STATES PATENT OFFICE.

ISIDOR OHNSTEIN, OF CHICAGO, ILLINOIS.

ART OF TREATING JUTE, BUTTS, AND ANIMAL-HAIR.

SPECIFICATION forming part of Letters Patent No. 277,054, dated May 8, 1883.

Application filed February 21, 1882. (Specimens.)

*To all whom it may concern:*

Be it known that I, ISIDOR OHNSTEIN, of Chicago, in the county of Cook and State of Illinois, have invented certain new and useful Improvements in the Art of Treating Jute, Butts, and Animal-Hair; and I do hereby declare that the following is a full, clear, and exact description thereof.

This invention consists in the improvement in the art of treating jute, butts, and animal-hair, as hereinafter described and claimed, to adapt the same to be used in the manufacture of wadding or batting.

In carrying out my invention I use lowest quality of jute, generally known in the trade as "rejection." This I pass through suitable machinery, in a perfectly dry condition, that will tear and break it up into fine fibers. The butts I treat in a like manner, and the animal-hair I macerate in a solution of lime for about three hours, and then clean it with boiling water. Next I steep the three materials in a solution of potash and logwood for giving them a uniform color, or in any other dye, for about four hours; and next I dry the materials in a room that is heated to about 110° Fahrenheit. Now the material is thoroughly mixed in suitable willowing machinery, and is next passed through batting machinery, where it is formed into spongy, downy, and even wads, in a similar manner as for making cotton-wadding. For the purpose of making the fibers very pliant and soft, I moisten the material during the mixing process with a solution of two parts of castor-oil diluted with one part of pure alcohol. The product thus obtained is very durable and odorless, can be used for all purposes, is equal in every respect to cotton or wool wadding or batting, while its cost is much less than that of all waddings or battings heretofore manufactured.

What I claim is—

The improvement in the art of treating jute, butts, and animal-hair to adapt the same for use in the manufacture of wadding, herein described, consisting in tearing the jute into fine fibers, then macerating the animal-hair in a solution of lime, then washing such hair in boiling water, then steeping the several materials in a solution of potash and dye-stuff, then drying the materials, then mixing and moistening the same with castor-oil and alcohol, and finally batting the same, substantially as set forth.

In testimony that I claim the foregoing as my invention I affix my signature in presence of two witnesses.

ISIDOR OHNSTEIN.

Witnesses:
F. W. KASEHAGEN,
J. ERIEMTARD.